US010539398B2

(12) United States Patent
Rodrigues

(10) Patent No.: US 10,539,398 B2
(45) Date of Patent: Jan. 21, 2020

(54) IMPACT SUPPRESSOR

(71) Applicant: Nildson de Souza Rodrigues, Sobradinho-Distrito Federal (BR)

(72) Inventor: Nildson de Souza Rodrigues, Sobradinho-Distrito Federal (BR)

(*) Notice: Subject to any disclaimer, the term of this patent is extended or adjusted under 35 U.S.C. 154(b) by 195 days.

(21) Appl. No.: 15/678,925

(22) Filed: Aug. 16, 2017

(65) Prior Publication Data
US 2019/0056203 A1    Feb. 21, 2019

(51) Int. Cl.
*F41H 5/04* (2006.01)
*B32B 5/18* (2006.01)
*B32B 5/02* (2006.01)
*B32B 27/12* (2006.01)
*B32B 27/06* (2006.01)
(Continued)

(52) U.S. Cl.
CPC ............... *F41H 5/04* (2013.01); *B32B 3/28* (2013.01); *B32B 5/028* (2013.01); *B32B 5/18* (2013.01); *B32B 27/065* (2013.01); *B32B 27/08* (2013.01); *B32B 27/12* (2013.01); *B32B 27/32* (2013.01); *B32B 27/34* (2013.01); *B32B 27/36* (2013.01); *B32B 27/40* (2013.01); *F41H 5/0478* (2013.01); *B32B 2250/24* (2013.01); *B32B 2262/0223* (2013.01); *B32B 2262/0276* (2013.01); *B32B 2266/0278* (2013.01); *B32B 2307/56* (2013.01); *B32B 2571/02* (2013.01); *F41H 1/02* (2013.01)

(58) Field of Classification Search
CPC . F41H 5/04; F41H 5/0478; F41H 1/02; B32B 27/065; B32B 27/12; B32B 5/18; B32B 2266/0278
See application file for complete search history.

(56) References Cited

U.S. PATENT DOCUMENTS 6,109,434 A * 8/2000 Howard, Jr. .......... G06F 1/1601
                                                              206/320
8,939,058 B1    1/2015 Ecalono
(Continued)

FOREIGN PATENT DOCUMENTS

CA           2624058       9/2014
CN         201497430       6/2010
(Continued)

OTHER PUBLICATIONS

Testing in Brazil: a version of the impact suppressor invented by the inventor Nildson de Souza Rodrigues. The exterior of this impact suppressor, and the general impact suppressing properties, were observed by the testers who Tested the impact suppressor in Brazil on Jun. 29, 2016. No interior layers were observed or disclosed.

*Primary Examiner* — Hai Vo
(74) *Attorney, Agent, or Firm* — Law Office of Paul B. Johnson; Paul B. Johnson

(57) ABSTRACT

Disclosed herein are multiple implementations of impact suppressors. Each impact suppressor is formed of multiple polymer layers. In implementations each polymer layer is one of the following: a solid polymer layer, a flat foam polymer layer, a corrugated polymer layer, and/or a peak-and-valley shaped polymer layer. The impact suppressors are configured to be worn by a user below a bullet-proof vest to reduce the impact force from an impact, such as from a bullet or other projectile hitting the bullet-proof vest, thus reducing the likelihood of injury and/or bruising.

8 Claims, 6 Drawing Sheets

(51) Int. Cl.
    *B32B 27/08*     (2006.01)
    *B32B 27/32*     (2006.01)
    *B32B 27/36*     (2006.01)
    *B32B 27/34*     (2006.01)
    *B32B 27/40*     (2006.01)
    *B32B 3/28*     (2006.01)
    *F41H 1/02*     (2006.01)

(56) References Cited

U.S. PATENT DOCUMENTS

| | | |
|---|---|---|
| 9,127,914 B2 | 9/2015 | Millar |
| 9,250,041 B2 | 2/2016 | Howland et al. |
| 9,279,258 B2 | 3/2016 | Cormier et al. |
| 9,381,728 B2 | 7/2016 | Hanks et al. |
| 2003/0186021 A1* | 10/2003 | Tanaka .............. A44B 18/0034 428/97 |
| 2008/0235855 A1* | 10/2008 | Kobren .............. A41D 13/0518 2/463 |
| 2010/0186134 A1* | 7/2010 | Hunter .............. A45F 3/04 2/2.5 |
| 2012/0210498 A1* | 8/2012 | Mack .............. A42B 3/0466 2/414 |
| 2012/0295057 A1 | 11/2012 | Atorrasagasti |
| 2014/0230638 A1 | 8/2014 | Waldrop |
| 2015/0375474 A1* | 12/2015 | Degolier .............. A41D 13/05 428/138 |

FOREIGN PATENT DOCUMENTS

| | | |
|---|---|---|
| CN | 201666760 | 12/2010 |
| CN | 103940295 | 7/2014 |
| WO | WO2014199277 | 12/2014 |

\* cited by examiner

IMPACT SUPPRESSOR

BACKGROUND

1. Technical Field

Aspects of this document relate generally to devices to reduce the impact force of a projectile.

2. Background Art

Bullet-proof and other protective devices are used by law enforcement personnel, security forces, military, and the like, to protect against severe injury and/or death from bullets, knives, shrapnel, and other projectiles. Such protective devices are often configured to stop a bullet or other projectile from entering the torso or other portion of a body of a person, but are not sufficient to reduce the impact force sufficient to prevent all injury. For example, some users may still receive heavy bruising, breaking of one or more ribs, or other internal damage from a bullet impact, although not being more seriously injured or dying, from a bullet impact to a bullet proof vest. Impact suppressors or trauma packs are known in the art to reduce the impact force reaching the user, such as that shown in WIPO publication number WO2014199277A1, submitted in an information disclosure statement herewith.

SUMMARY

Embodiments of impact suppressors may include: one or more flat foam polymer layers; one or more secondary polymer layers selected from the group consisting of: peak-and-valley shaped polymer layers each having a repeating pattern of peaks separated by valleys, and polymer webbing layers; one or more tertiary polymer layers selected from the group consisting of: solid polymer layers and corrugated polymer layers, and; a covering substantially enclosing the one or more flat foam polymer layers, the one or more secondary polymer layers, and the one or more tertiary polymer layers; wherein the impact suppressor is sized and shaped to fit between a user and a bullet-proof vest being worn by the user.

Embodiments of impact suppressors may include one or more or all of the following:

The one or more flat foam polymer layers may include a polyurethane foam layer.

Each of the one or more flat foam polymer layers may have a thickness of between 0.2 cm and 1.0 cm.

The one or more secondary polymer layers may include one or more peak-and-valley shaped polymer layers, and each peak-and-valley shaped polymer layer may be a polymer foam.

The one or more secondary polymer layers may include one or more polymer webbing layers, and the polymer webbing layers may be selected from the group consisting of: polyester webbing layers, and nylon webbing layers.

The one or more tertiary polymer layers may include at least one solid polymer layer, the at least one solid polymer layer formed of a polymer selected from the group consisting of: polyvinyl chloride (PVC), polyethylene terephthalate (PET), and polypropylene (PP).

The one or more tertiary polymer layers may include one or more solid polymer layers, the one or more solid polymer layers having a combined thickness of at least 1.5 mm.

The one or more solid polymer layers may have a combined thickness of at least 2.0 mm.

The one or more tertiary polymer layers may include at least one corrugated polymer layer, the at least one corrugated polymer layer including a fluted polypropylene sheet.

The covering may be formed of nylon.

The covering may fully enclose the one or more flat foam polymer layers, the one or more secondary polymer layers, and the one or more tertiary polymer layers.

The impact suppressor may have a total thickness of less than 2.0 cm.

The impact suppressor may be shaped into a cuboid.

The one or more flat foam polymer layers, the one or more secondary polymer layers, and the one or more tertiary polymer layers may total fewer than ten total layers.

The one or more flat foam polymer layers, the one or more secondary polymer layers, and the one or more tertiary polymer layers may total fewer than eight total layers.

Embodiments of impact suppressors may include: one or more flat foam polymer layers; one or more additional polymer layers selected from the group consisting of: solid polymer layers, peak-and-valley shaped polymer layers, polymer webbing layers, and corrugated polymer layers, and; a coupler holding the one or more flat foam polymer layers and the one or more additional polymer layers snugly together, wherein the impact suppressor is sized and shaped to fit between a user and a bullet-proof vest being worn by the user.

Embodiments of impact suppressors may include one or more or all of the following:

The impact suppressor may be formed into a cuboid having a thickness less than 2.0 cm.

Embodiments of impact suppressors may include: a plurality of polymer layers selected from the group consisting of: solid polymer layers, peak-and-valley shaped polymer layers, flat foam polymer layers, polymer webbing layers, and corrugated polymer layers; wherein the plurality of polymer layers are not configured to stop the passage therethrough of a bullet fired from a firearm, and; wherein the impact suppressor is enclosed within a bullet-proof vest.

Embodiments of impact suppressors may include one or more or all of the following:

The plurality of polymer layers may include polymer webbing layers selected from the group consisting of polyester webbing layers and nylon webbing layers.

The impact suppressor may have a thickness less than 2.0 cm.

General details of the above-described embodiments, and other embodiments, are given below in the DESCRIPTION, the DRAWINGS, and the CLAIMS.

BRIEF DESCRIPTION OF THE DRAWINGS

Embodiments will be discussed hereafter using reference to the included drawings, briefly described below, wherein like designations refer to like elements.

DESCRIPTION

Implementations/embodiments disclosed herein (including those not expressly discussed in detail) are not limited to the particular components or procedures described herein. Additional or alternative components, assembly procedures, and/or methods of use consistent with the intended impact suppressor may be utilized in any implementation. This may include any materials, components, sub-components, methods, sub-methods, steps, and so forth.

As used herein, the term "solid polymer layer" refers to a layer of polymer that is impermeable to water and includes less than 10% air by volume.

As used herein, the term "corrugated polymer layer" refers to any polymer layer that is over 75% hollow and includes structurally reinforcing components within a hollow portion of the polymer layer. Such structurally reinforcing components may, for example, be perpendicular to or angled to, and fixedly attached to, a top and bottom sheet of polymer to form the corrugated polymer layer. Fluted twin-wall polypropylene structures, commonly called "fluted polypropylene boards" or "fluted polypropylene sheets" in the art, are examples of "corrugated polymer layers."

Figure 1:
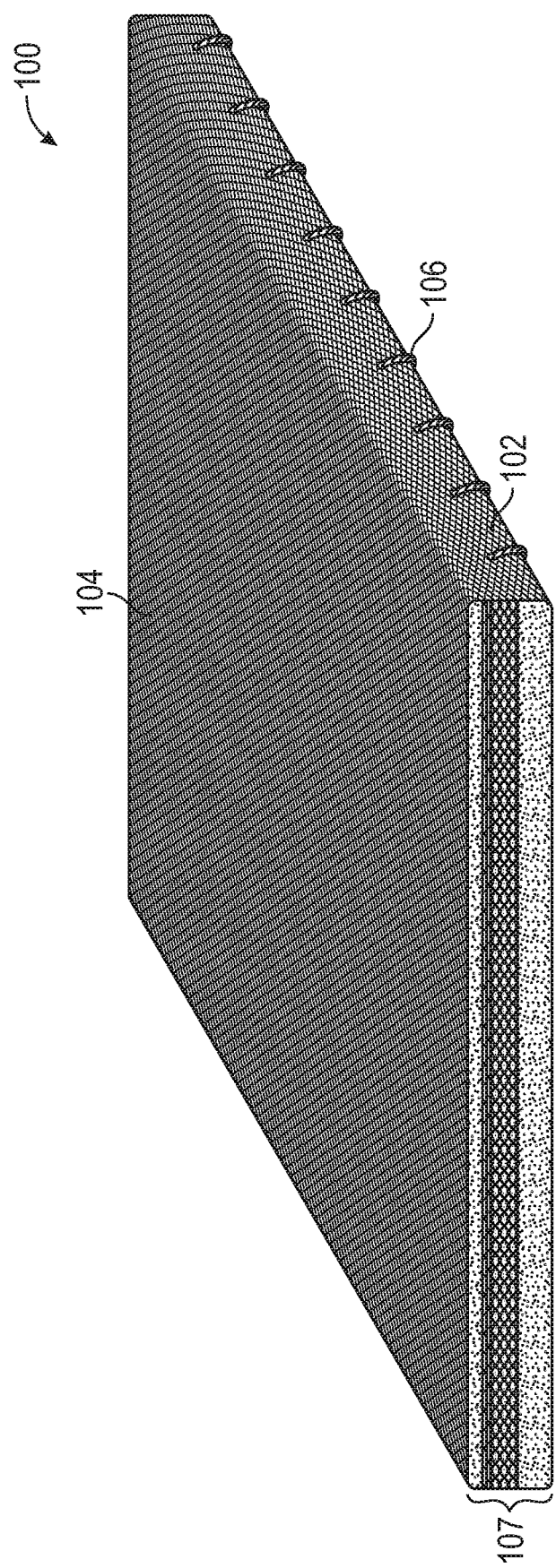
FIG. 1 is a front perspective cross-section view of an implementation of an impact suppressor.

Referring to FIG. 1, an implementation of an impact suppressor 100 is shown. The impact suppressor is seen to have a rectangular shape (or a cuboidal shape in three dimensions). The outermost portion of the impact suppressor is a covering 102 which holds together a number of layers 107. The covering in the representative example shown in FIG. 1 is a nylon sheet which is sewn closed using a binding element 106 which may be, by non-limiting example, a thread, rope, twine, etc. The layers 107 are seen in FIG. 1 because FIG. 1 is a cross-section view—in use the layers are not visible because they are fully enclosed within the covering. In other implementations the layers could be only partially enclosed, but having the layers fully enclosed allows the layers to be more snugly fit together and keeps the layers from moving relative to one another too much during an impact event.

In some implementations a coupler other than a covering could be used. By non-limiting example the layers could be glued together, or could be bound together by strings, rope, or other rigid or non-rigid elements traversing through one or more perforations formed in the layers. One advantage to using the covering is that no perforations are needed in the layers, and perforations could be weak points which would not be as useful for impact suppression. Another advantage of using the covering is that no adhesive is needed, and adhesive may alter the impact suppression characteristics of the device inasmuch as the layers would not have nearly as much ability to slide relative to one another during an impact. Nevertheless, for ease of construction in some implementations an adhesive spray or adhesive tape may be used to couple the layers together during manufacturing as this may ease manufacturing although adding one or more additional steps. Nevertheless, a covering which fully encloses the layers provides a useful way to hold the layers together once the assembly is complete and still allows the layers some limited freedom of movement to slide relative to one another during an impact event for desirable impact suppression characteristics.

The covering in the implementation of FIG. 1 is a nylon weave 104. In other implementations the covering could be formed of another material, such as a cloth weave, a cardboard, etc. A nylon weave is relatively lightweight and inexpensive, however, and is therefore a useful material for the covering. Other polymer could be used instead of nylon, or even non-polymers, such as cotton. Nylon is chosen in part because it is waterproof and thus forms a waterproof seal preventing sweat and the like from penetrating to the inside of the device and into the other layers. In the implementations shown in the drawings the covering is a nylon covering formed of 600 denier or 400 denier nylon, and in implementations the covering could be formed of a high density coated nylon fabric. Accordingly the coating may be such that on the inside the individual threads are not visible but they may be visible on the outer surfaces. In implementations the internal layers of FIG. 1 have a total thickness of about 1.9 cm, and the entire impact suppressor may have a total thickness less than 2.0 cm.

Figure 2:
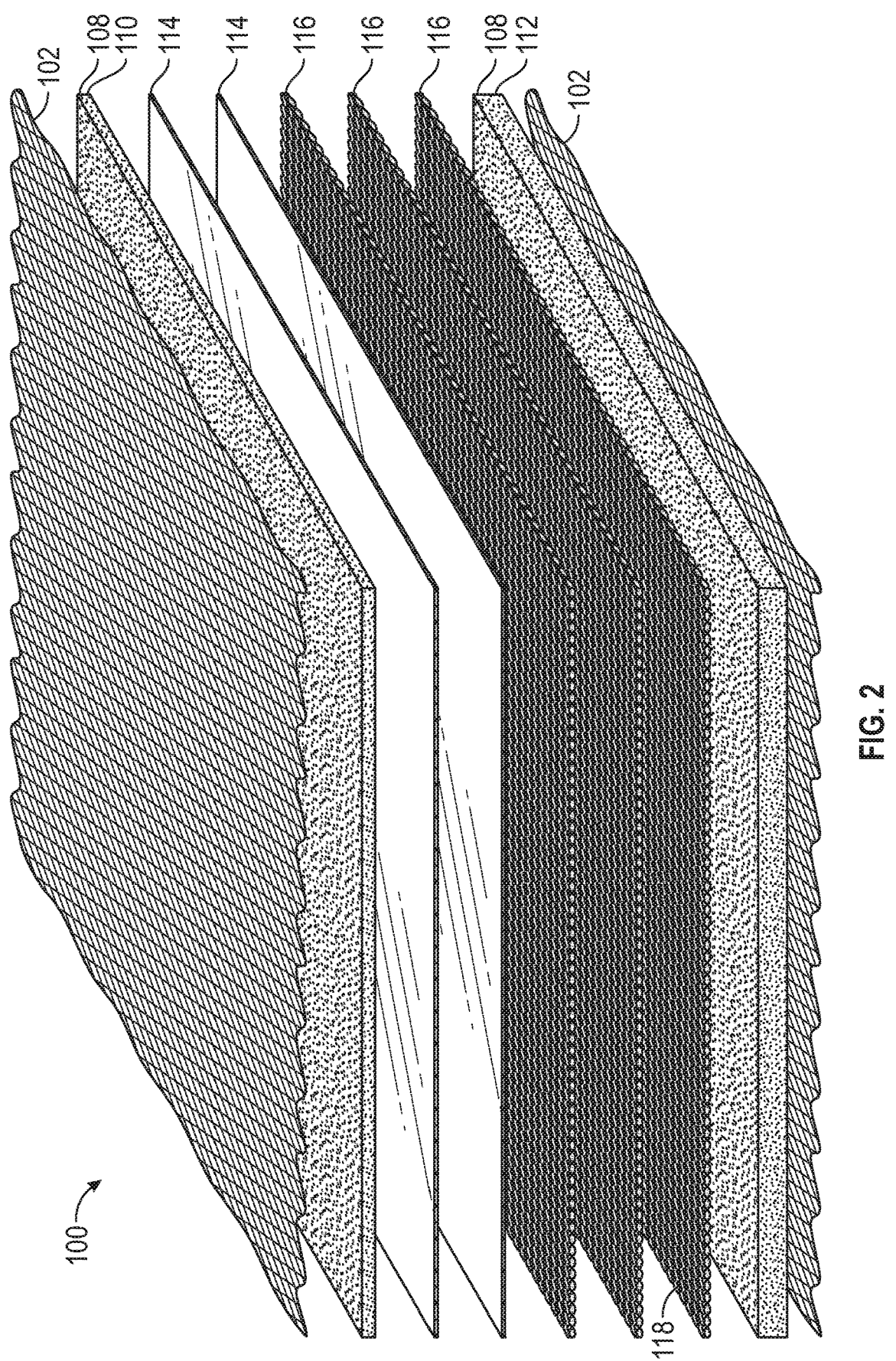
FIG. 2 is an exploded view of the impact suppressor of FIG. 1.

FIG. 2 is an exploded view of the several layers of the impact suppressor 100. As can be seen, the covering 102 encloses two flat foam polymer layers 108, which are in the outermost positions relative to the other layers. There is a first flat foam polymer layer 110 and a second flat foam polymer layer 112, and it can be seen that layer 112 is thicker than layer 110. In the implementations shown the layers 110 and 112 are formed of polyurethane foam having an indentation load deflection (IDT) of 30 or 33, or between 30-33 (measured as the number of pounds of pressure required to indent 4 inches of foam by 25% using a 50 square inch indentation). In other implementations the IDT could be as high as 60. Other foams such as latex foams could be used, but they would increase the weight. Ethyl vinyl acetate (EVA) foam is an option though in experimentation it was determined that if EVA is used it should not be the only foam layer, since EVA by itself (even 2 cm thick) provides noticeably less impact suppression than when a polyurethane foam layer was included. In other implementations these layers could be formed of other polymer foams. In some implementations the first flat foam polymer layer is a 0.8 mm thick ethylene-vinyl acetate (EVA) closed-cell foam and the second flat foam polymer layer is a polyurethane foam. In other implementations both are polyurethane foam, with the first being 4 mm in thickness and the second being 1 cm in thickness. In implementations the first flat foam polymer layer may have a webbed backing attached or adhered thereto, such as a webbed or woven string layer, though in other implementations this may be omitted. The flat foam polymer layers have flat surfaces as opposed to bumpy or more richly-textured surfaces (in contrast with layers 116 which will hereafter be described) and are useful for impact absorption, since the air cavities within the foam allows these layers to significantly elastically deform by condensing under pressure. This prevents some of the force from an impact from being transferred to the body of a user, since some of the work performed by the impacting projectile is used to condense the foam. In addition to compressing, the foam layers are also configured to bend to some degree during an impact event.

A number of solid polymer layers 114 are also included. In the implementation shown in FIG. 2 the solid polymer layers are formed of polyvinyl chloride (PVC), but in other implementations they could be formed of other polymer such as polyethylene terephthalate (PET) or high density PET. PET would be lighter and stronger than PVC. In other implementations polypropylene (PP) could be used. The PVC layers in the implementation shown in the drawings are each 0.8 mm thick for a total thickness of 1.6 mm. In other implementations three layers are used for a total thickness of 2.4 mm. It has been found in experimentation that a total thickness of about 2.4 mm allows the overall device to be thin while, at the same time, providing improved dispersion of the impact force. Accordingly, in some implementations the first flat foam polymer layer 108 is excluded and a third solid polymer layer 114 is added so that there is a total thickness of about 2.4 mm of solid polymer layers and so that the first layer behind the covering is a solid polymer layer. In other implementations a single layer could be used, such as a single PVC layer, or a single PET layer, or a single PP layer, having a thickness of about 2.4 mm. In other implementations multiple layers could be used to reach up to about 2.4 mm. As there may be some variations in thicknesses, it is expected that, based on the testing that was performed, the optimal thickness for the solid polymer layer(s) would probably be between 2.0 and 3.0 mm total thickness, to achieve proper impact force dispersion but also to keep the overall device thin. It is desirable to keep the device thin so that it is not cumbersome or uncomfortable when worn by a user, and so clothing and other items will still fit the user comfortably, as the bullet proof vest and impact suppressor may be worn beneath an outer layer of clothing. In some implementations silicone or rubber could be used for the solid polymer layer(s), though these would be heavy and increase expense.

Returning to the implementation shown in FIG. 2, there are two layers 114, each of them placed below the thinner flat foam polymer layer 110. The layers 114 are transparent in the implementation shown, but this is not necessary and other layers 114 could be translucent or opaque. The layers 114 are not configured to compress much during an impact but they are configured to elastically deform by bending and this spreads out the impact force.

Several peak-and-valley shaped polymer layers 116 are also shown. It can be seen in FIG. 2 that there are three of these layers and that they are all stacked atop one another. In implementations these layers are formed of common anti-skid materials which can readily be purchased from home improvement stores, and may be formed of polyester foam covered with soft PVC. In other implementations other materials could be used. The layers 116 have repeating patterns of peaks separated by valleys, and in some implementations each valley includes an opening 118 which is a through-hole extending through the layer. In implementations the peak-and-valley shaped polymer layers each have a thickness of about 0.90 to 1.00 mm. In testing it was found that the peak-and-valley configuration and/or holes/openings present in the material allow the material to reduce and spread out the impact force effectively. This may be because the peak-and-valley configuration and the openings allow greater bending of the material. It is also true that the air pockets within the foam (as with the other foam layers described herein) helps to reduce and spread out the impact force by allowing significant compression of the material.

When several layers are stacked together, as shown in FIG. 2, it can be readily understood that each layer may bend and some layers may compress, and that the bending at each layer further away from the impact is reduced relative to the preceding layer. Accordingly, the concavity at the first layer will be greater than the concavity at the last layer, thus protecting the user from a highly forceful impact by spreading out the force of the impact to a greater surface area. The ability of the layers to slide somewhat relative to one another within the covering may also assist in this mechanism—since the layers may not be glued or adhered to one another, the concavity at each successive layer may be more greatly reduced until the last layer has a relatively low concavity during an impact event. Thus the bullet-proof vest may spread out the impact force to a first surface area, but the impact suppressor will receive this force from the bullet proof vest and spread it out to a greater surface area, thus further reducing the likelihood of injury, bruising, breaking bones, etc., from an impact event.

It should be understood that the specific layer arrangement shown in FIG. 2 is only one representative example, and that in other implementations other arrangements could be used. Nevertheless, in the example shown in FIG. 2 the top layer is that which would contact or face the bullet-proof vest, and the bottom layer is that which would contact or face the user, so that the force from the bullet-proof vest (transferred from a projectile) first pushes against the front portion of the covering, then the first flat foam polymer layer, then the solid polymer layers, then the peak-and-valley shaped polymer layers, then the second flat foam polymer layer, then the back portion of the covering, then the user or the user's clothing.

Figure 3:
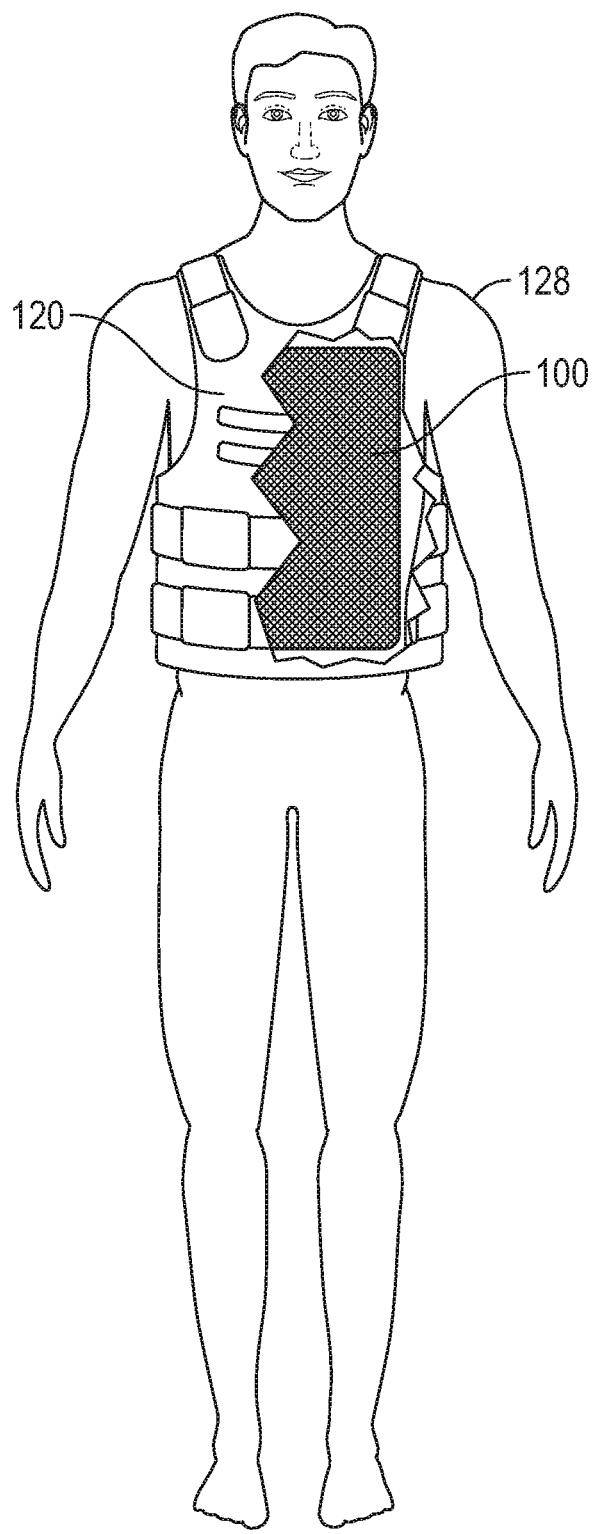
FIG. 3 is a diagram of the impact suppressor of FIG. 1 shown being used by a user in conjunction with a bullet-proof vest (the bullet-proof vest shown in cutaway to reveal the impact suppressor)

FIG. 3 shows a user 128 wearing a bullet-proof vest 120, and the bullet-proof vest is shown in cutaway so that the impact suppressor 100 may be seen. The impact suppressor is worn by the user between the user and the bullet-proof vest.

Figure 4:
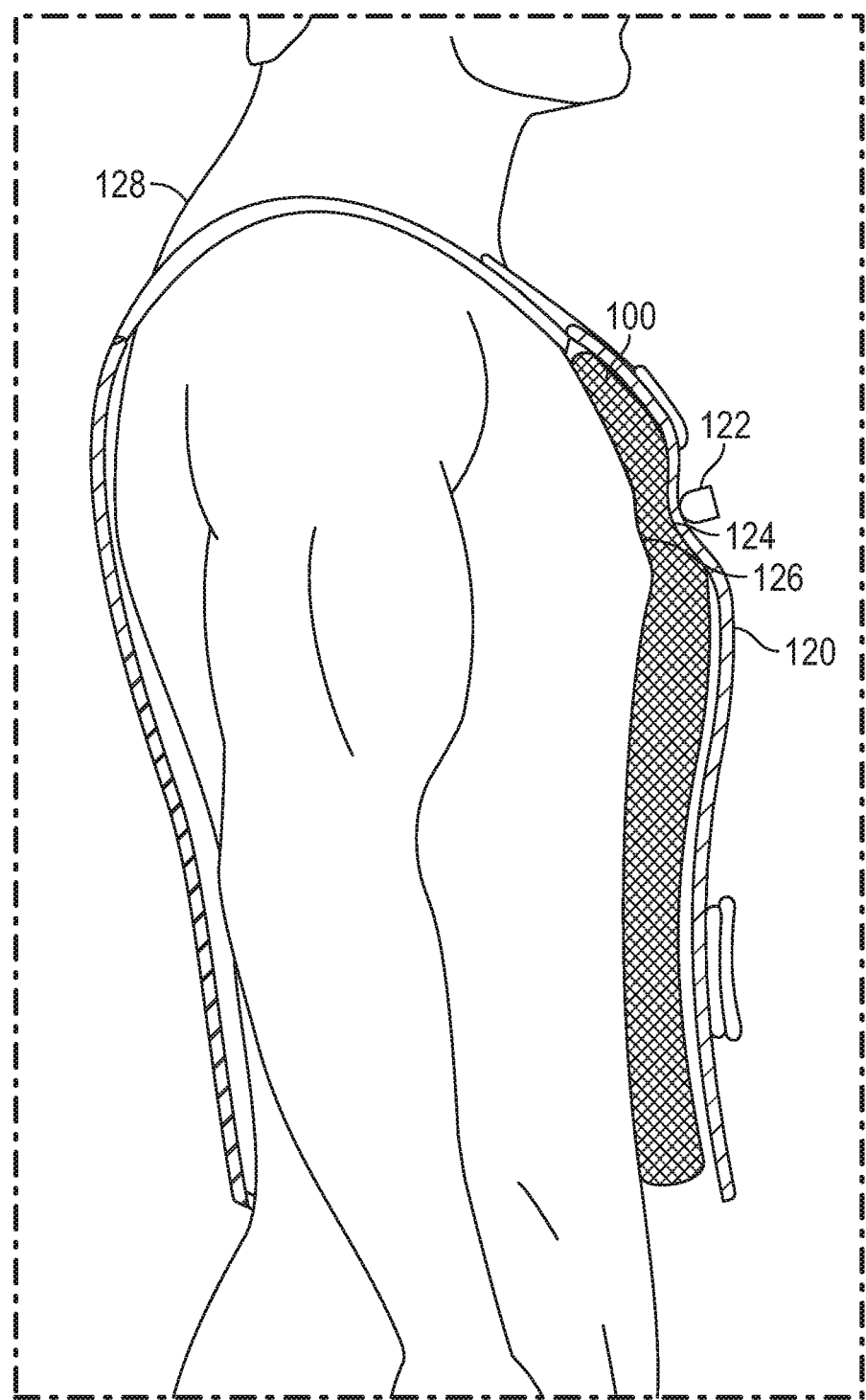
FIG. 4 is a side cross-section view of the impact suppressor of FIG. 1 used in conjunction with a bullet-proof vest.

FIG. 4 shows a side view of a user 128 wearing a bullet-proof vest 120 and wearing the impact suppressor 100 between the bullet-proof vest and the user. It may be understood that by "wearing" it is simply meant that the impact suppressor may stay in place by the pressure of the snug fit of the bullet-proof vest itself, because in the implementations shown the impact suppressor is simply a cuboidal shape having no mechanism whereby to attach to the user's body or clothing. In other implementations the impact suppressor could have over-the-shoulder straps or torso straps to fix it in place, but in general the tightening of the bullet-proof vest will be sufficient to hold it in place.

In FIG. 4 a bullet 122 is seen impacting the bullet-proof vest, and it can be seen that although the vest prevents penetration of the bullet, nevertheless the bullet impact force creates a concavity (impact concavity 124) of the vest, some of which force and concavity is transferred to the impact suppressor. The front of the suppressor thus has a first impact concavity 124, but it can be seen that the rear of the impact suppressor has a reduced impact concavity 126 (transferred to the user's body), due do the mechanisms described above, to reduce or eliminate bruising/injury to the user when a bullet impacts. Accordingly, the bullet-proof vest absorbs some of the impact force of the bullet or projectile, and then the impact suppressor absorbs some of the impact force from the bullet-proof vest, and then the user's body absorbs some of the impact force from the impact suppressor, but by the time the force reaches the user's body it is greatly reduced.

The impact force also gets spread out over a greater surface area as the force penetrates the different layers. At each layer the force is accordingly reduced and spread out over a larger area, so that by the time the force reaches the user's body it is weakened and spread over a large area.

Although FIG. 4 does not show it, it is to be understood that an impact suppressor would normally also be worn at the back of the user, between the back of the user and the back portion of the bullet-proof vest to protect the back of the user from impact.

Figure 5:
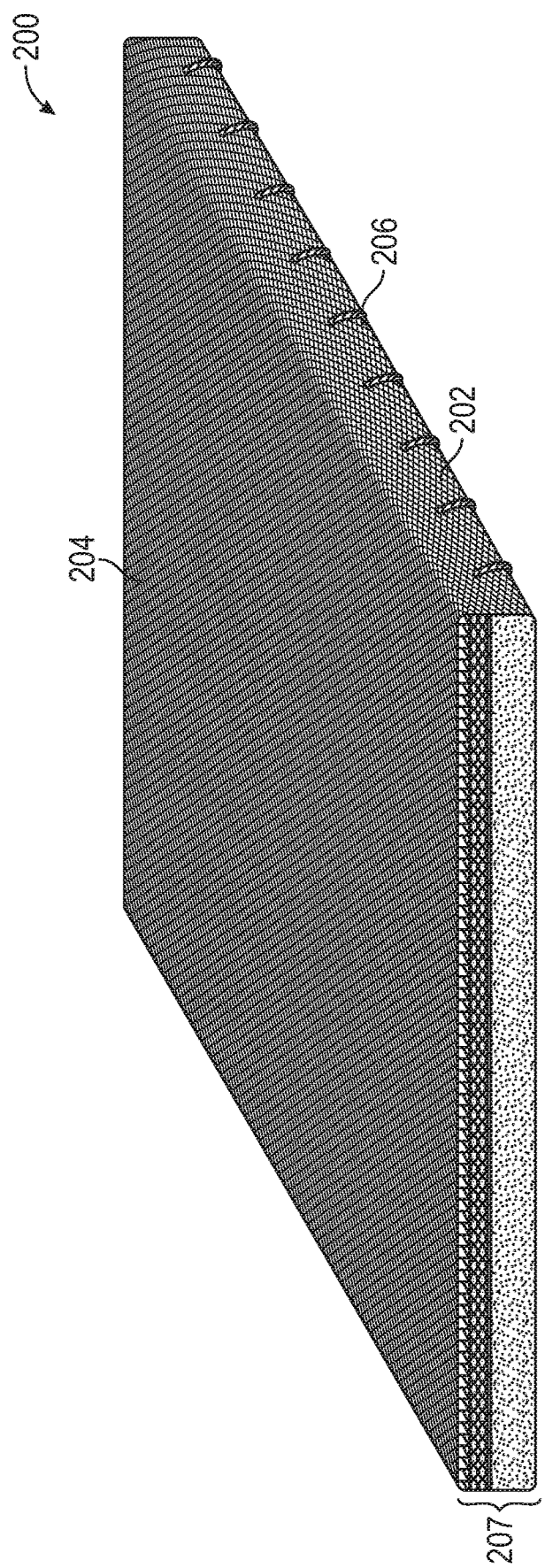
FIG. 5 is a front perspective cross-section view of another implementation of an impact suppressor.
Figure 6:
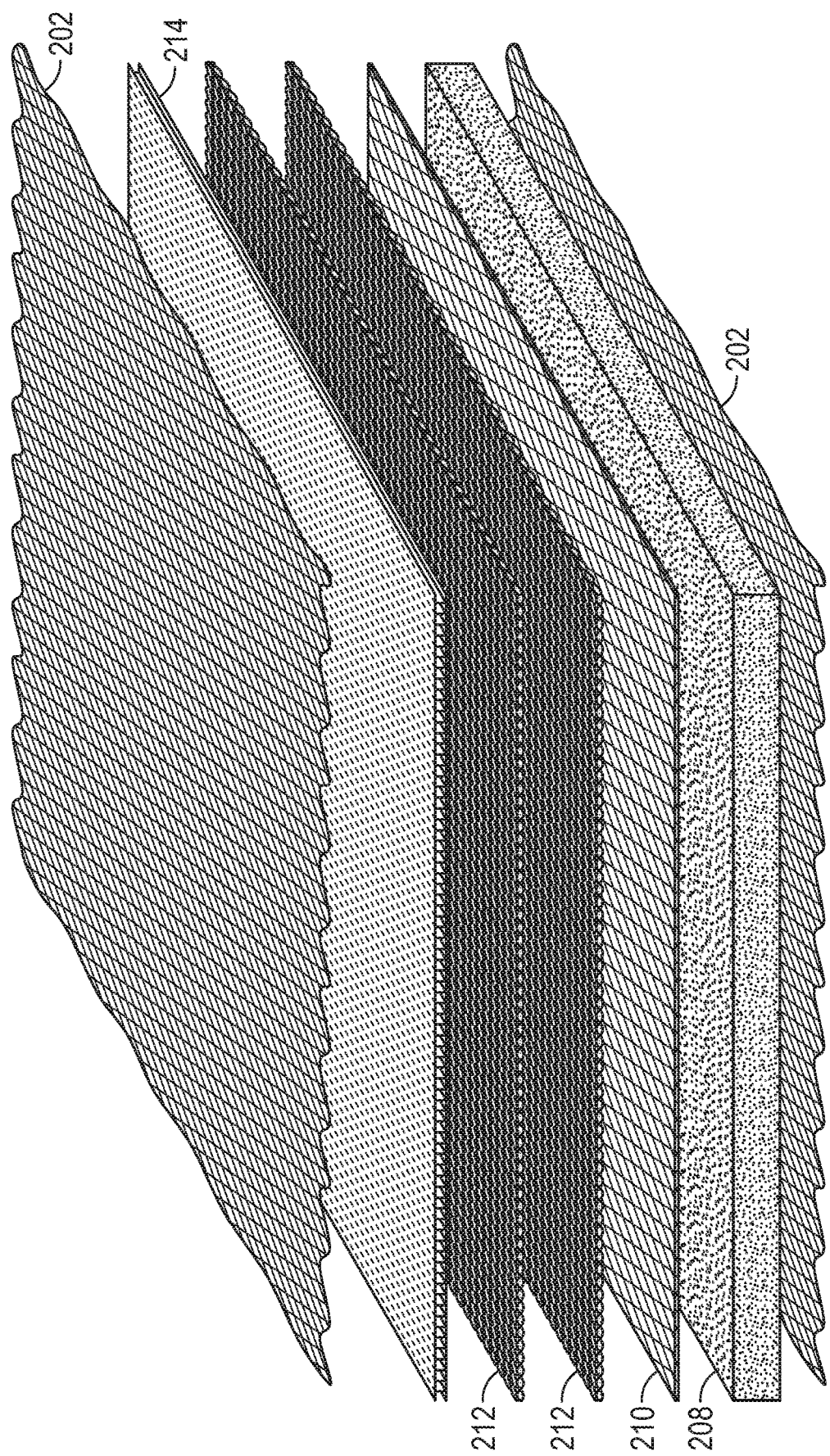
FIG. 6 is an exploded view of the impact suppressor of FIG. 5.

FIGS. 5-6 shown another version of an impact suppressor. Impact suppressor 200 is similar in many ways to impact suppressor 200, in that it includes a covering 202 which is a nylon weave 204 closed with a binding element 206 which is a threaded element such as a polymer or thread string or rope. Impact suppressor 200 includes a number of layers 207. FIG. 6 shows that the topmost (or front) layer behind the covering is a corrugated polymer layer 214. After this layer there are two peak-and-valley shaped polymer layers 212, one polymer webbing layer 210, and then a flat foam polymer layer 208. The flat foam polymer layer and peak-and valley-shaped polymer layers may have the same characteristics as those described above for similarly-named layers of impact suppressor 100. The top layer of FIG. 6 is that which would face the bullet-proof vest and the bottom layer would face the user, so that the vest is closer to the corrugated polymer layer and the user's body is closer to the flat foam polymer layer. In other implementations an arrangement similar to that shown in FIG. 6 could be used except with the addition of a solid polymer layer similar to previously described solid polymer layers.

As to the polymer webbing layer 210, in implementations this layer is formed of a polyester or a nylon webbing. In implementations, this polymer webbing layer is formed of polymer webbing having the same configuration as common seatbelt material in terms of breaking strength, thickness, denier, and so forth. For example, any seatbelt material sold by Strapworks of Eugene, Oreg., such as nylon webbing having a thickness range of 0.040 to 0.045 inches and a breaking strength of 3000 pounds, or polyester webbing having a thickness range of 0.030 to 0.050 inches and a breaking strength ranging from 3000 to 6000 pounds, could be used. However, such seatbelt material would have a width not just of a few inches, as with seatbelts, but would be formed into a single sheet having the size of the impact suppressor, such as by non-limiting example a size of 8 inches by 11 inches, or 6 inches by 9 inches, and so forth. In other implementations seat belt material could be in normal strip sizes of 1-3 inch wide strips which themselves are interwoven together.

In the implementation of FIG. 6 the corrugated polymer layer may be the most important layer for the impact suppression (and in versions excluding the corrugated polymer layer the most important layers may be the solid polymer layers), nevertheless the specific combinations of layers may function to achieve the impact reduction so that each layer has some importance, i.e., so that the specific combinations of layers are important. The corrugated polymer layer may be formed of a number of materials or polymers, in the implementation shown it is a fluted polypropylene sheet sold under the trade name COROPLAST by Coroplast of Vanceburg, Ky. In terms of superiority of the elements and based on testing that was performed, the corrugated polymer layer has better impact suppression than the solid polymer layers (or better than a combination of three solid PVC polymer layers). If a corrugated polymer layer is not used then one or more PET layers having a thickness of about 2.4 mm should have less impact suppression than the corrugated polymer layer but greater impact suppression than about 2.4 mm of PVC. Of course, the layers can be combined so that there is a corrugated polymer layer plus one or more solid polymer layers, as shown in FIG. 6 where there is one solid polymer layer included.

The corrugated polymer layer shown in FIG. 6 has a total thickness of about 4.2 mm, with each sidewall and top and bottom walls having a thickness of about 0.35 mm. The height of each fluted air cavity is about 3.5 mm and the width of each fluted air cavity is about 5.0 mm. Other sizes could be used, but this size was found through experimentation to have desirable impact suppression properties.

Test Results

Ballistic testing on various impact suppressors was performed at the request of the inventor by Chesapeake Testing: an NTS Company of Belfast, Md. on Jul. 31, 2017 and Aug. 1, 2017. The ballistic projectiles used are detailed in Table 1 below:

TABLE 1

Ballistic Projectiles used in Ballistic Testing 0.44-mag., 240-grain semi-jacketed hollow point (SJHP) projectiles
0.357-cal., 125-grain SIG full metal jacketed flat nosed (FMJ FN) projectiles
0.357-mag., 158-grain jacketed soft point (JSP) projectiles
9-mm, 124-grain FMJ projectiles
0.40-cal., 180-grain S&W FMJ projectiles
0.45 ACP, 230-grain full metal case (FMC) projectiles
7.62 × 51-mm, 149-grain M80 FJM projectiles
5.56 × 45-mm, 55 grain M193 Ball projectiles Testing was performed using a bullet-proof vest with versions of impact suppressors disclosed herein, and other variations, placed behind the vest and these placed in front of a layer of 5.5 inch-thick clay with a plywood backing clamped to a rigid test fixture. Projectiles were fired with less than 3-degrees total yaw and projectile velocity measurements were done using infrared screens and counter chronographs. Projectiles were fired from a close range of 17.2 feet and a long range of 50.2 feet. A caliper was used to measure impact depths due to the impact force. These results are submitted herewith as Appendix A and show the impact suppression properties. The entire disclosure of Appendix A is incorporated herein by reference. A summary of results is also given in Appendix B, disclosed herewith and the entire disclosure of which is entirely incorporated herein by reference.

The solid polymer layer of the implementation of FIG. 6 could be excluded, so that the only internal layers are the corrugated polymer layer, one or more peak-and-valley shaped polymer layers, and one or more flat foam polymer layers. In other implementations the layers may be mixed and matched by the practitioner of ordinary skill in the art to achieve the proper thickness and impact suppression properties.

In the implementations shown in the drawings the impact suppressors are configured to be used with any level of bullet-proof vest. The tests described above were performed with level II (level 2) and level IIIA (3A) bullet-proof vests. Other implementations could be configured to be used with other bullet-proof vest levels.

In one implementation, the test results of which are included in Appendices A and B, an impact suppressor consists of one corrugated polypropylene polymer layer as described above, two peak-and-valley shaped polymer layers behind this as described above, and one 1 cm thick polyurethane foam layer behind these as described above, all covered in a nylon weave covering as described above and stitched closed with a binding element.

In another implementation, the test results of which are included in Appendices A and B, an impact suppressor consists of three PVC layers, each 0.8 mm for a total of 2.4 mm, three peak-and-valley shaped polymer layers behind the PVC layers, and a 1 cm thick polyurethane foam layer behind these, all covered in a nylon weave covering and stitched closed with a binding element.

In another implementation, the test results of which are included in Appendices A and B, an impact suppressor consists of two PVC layers, each 0.8 mm for a total of 1.6 mm, two peak-and-valley shaped polymer layers behind the PVC layers, and a 1 cm thick polyurethane foam layer behind these, all covered in a nylon weave covering and stitched closed with a binding element.

In another implementation, the test results of which are included in Appendices A and B, an impact suppressor included a 0.9 mm thick acrylic layer, but this version did not perform well and so an acrylic layer is not recommended with the other layer types disclosed herein.

In another implementation, the test results of which are included in Appendices A and B, an impact suppressor included the following layers in the following order: a 400 denier nylon covering, a 0.8 mm EVA foam layer, a corrugated PP sheet having the same properties and dimensions as that described above with respect to FIG. 6, a peak-and-valley shaped polymer layer having the same dimensions as those described above for other implementations, two PVC layers of about 0.9-1.0 mm thickness having cloth backings, and a 1 cm thick polyurethane flat foam layer.

Another implementation of an impact suppressor may include the following layers in the following order: a 400 denier nylon covering, a 0.8 mm EVA foam layer, an about 1.0 mm thick polymer webbing layer formed of seatbelt-type material as described above, a corrugated PP sheet having the same properties and dimensions as that described above with respect to FIG. 6, a second about 1.0 mm thick polymer webbing layer formed of seatbelt-type material, and a 1 cm thick polyurethane flat foam layer. The polymer webbing layers may each be one contiguous layer or, as described above, could be formed of 1-3 inch wide polymer webbing strips which are interwoven/interlaced.

Other implementations may include a first 4 mm thick polyurethane foam layer, a 0.8 mm EVA layer next, one 0.9-1.0 mm peak-and-valley shaped layer next, one 0.8 mm thick PVC or PET layer next, two 0.9-1.0 mm peak-and-valley shaped layers next, another 0.8 mm thick PVC or PET layer next, and then one 1 cm thick polyurethane foam layer, all covered with a nylon covering and sewn shut with a thread.

Other implementations may include a first 4 mm thick polyurethane foam layer, three 0.8 mm thick PVC or PET layers next, three 0.9-1.0 mm peak-and-valley shaped layers next, and then a 1 cm thick polyurethane foam layer, all covered with a nylon covering and sewn shut with a thread.

Again, layer types may be mixed and matched in any given implementation and/or number of layers modified to achieve a desired weight, thickness, and impact suppression characteristics.

In other implementations, the nylon covering could be heat sealed, and/or the covering could include some material other than nylon.

The impact suppressor may be formed into a cuboid having a thickness less than 2.0 cm, or less than 1.7 cm, or less than 1.6 cm, or less than 1.5 cm, or a total thickness of 1.5 cm, or a total thickness of 1.57 cm. In implementations, the impact suppressor may have a total thickness between 1.0 and 2.0 cm.

Implementations of impact suppressors may have fewer than 10 (or in some implementations fewer than 8) total internal layers, which allows for ease of manufacturing.

In the implementations shown in the drawings the impact suppressors have a rectangular/cuboidal form. In other implementations they could be formed into a vest form or could be incorporated within a bullet-proof vest. In such implementations the polymer layers that form the impact suppressor would be placed behind the bullet-stopping layers. By non-limiting example, if the bullet-stopping layers are formed of para-aramid synthetic fibers (such as those sold under the trade name KEVLAR by DuPont of Wilmington, Del.), the impact suppressor layers would be placed behind the KEVLAR layers. In such implementations the bullet-stopping layers prevent the bullet from penetration therethrough, so that the bullet does not penetrate through to the impact suppressor layers, but the impact suppressor layers reduce the impact force that reaches the user. The impact suppressor layers themselves are not configured to stop a bullet, inasmuch as a bullet fired at the impact suppressor layers, without the bullet-stopping layers in front of them, would pass through the impact suppressor layers.

Thus, the impact suppressor layers are not configured to stop a bullet, rather they are intended to lower the force of impact transferred from the bullet-stopping layers to the user. In implementations in which the impact suppressor layers are incorporated within a bullet proof vest, the impact suppressor layers could exclude the covering, but could be sewn or otherwise enclosed within the vest. Although an implementation in which the impact suppressor layers is included within a vest is not shown in the drawings, such implementation does not need to be shown for full disclosure and enablement, because FIG. 4 clearly shows an implementation of an impact suppressor behind a bullet proof vest, and the only change the practitioner of ordinary skill in the art would need to make is to sew the same impact suppressor within the bullet-proof vest, either with or without the covering 102, to form such an implementation of an impact suppressor. In places where the description above refers to specific embodiments of impact suppressor, one or more or many modifications may be made without departing from the spirit and scope thereof. Details of any specific embodiment described herein may, wherever possible, be applied to any other specific embodiment described herein.

What is claimed is:

1. An impact suppressor, consisting of:
one or more flat foam polymer layers;
one or more secondary polymer layers selected from the group consisting of: peak-and-valley shaped polymer layers each comprising a repeating pattern of peaks separated by valleys, and polymer webbing layers;
one or more tertiary polymer layers comprise at least one corrugated polymer layer comprising a fluted polypropylene sheet, and;
a covering substantially enclosing the one or more flat foam polymer layers, the one or more secondary polymer layers, and the one or more tertiary polymer layers, wherein the covering is formed of a nylon weave;
wherein the one or more secondary polymer layers and one or more tertiary polymer layers are coextensive to each other;
wherein the impact suppressor is sized and shaped to fit between a user and a bulletproof vest being worn by the user, and;
wherein the impact suppressor comprises a total thickness of less than 2.0 cm.

2. The impact suppressor of claim 1, wherein the one or more flat foam polymer layers comprises a polyurethane foam layer.

3. The impact suppressor of claim 1, wherein each of the one or more flat foam polymer layers comprises a thickness of between 0.2 cm and 1.0 cm.

4. The impact suppressor of claim 1, wherein the one or more secondary polymer layers includes one or more polymer webbing layers, the polymer webbing layers selected from the group consisting of: polyester webbing layers, and nylon webbing layers.

5. The impact suppressor of claim 1, wherein the covering fully encloses the one or more flat foam polymer layers, the one or more secondary polymer layers, and the one or more tertiary polymer layers.

6. The impact suppressor of claim 1, wherein the impact suppressor is shaped into a cuboid.

7. The impact suppressor of claim 1, wherein the one or more flat foam polymer layers, the one or more secondary polymer layers, and the one or more tertiary polymer layers comprise fewer than ten total layers.

8. The impact suppressor of claim 7, wherein the one or more flat foam polymer layers, the one or more secondary polymer layers, and the one or more tertiary polymer layers comprise fewer than eight total layers.

* * * * *